(12) United States Patent
Ohmori et al.

(10) Patent No.: US 6,522,621 B1
(45) Date of Patent: *Feb. 18, 2003

(54) DISC CASSETTE

(75) Inventors: Kiyoshi Ohmori, Kanagawa (JP); Sunao Aoki, Kanagawa (JP); Takakiyo Kanazawa, Kanagawa (JP); Takatsugu Funawatari, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1260 days.

(21) Appl. No.: 08/856,050

(22) Filed: May 14, 1997

Related U.S. Application Data (63) Continuation of application No. 08/375,680, filed on Jan. 20, 1995, now abandoned.

(30) Foreign Application Priority Data

Jan. 28, 1994 (JP) .............................................. 6-007962

(51) Int. Cl.$^7$ .............................................. G11B 23/03
(52) U.S. Cl. ...................................... 369/291; 360/133
(58) Field of Search ........................... 369/291; 360/133

(56) References Cited

U.S. PATENT DOCUMENTS 4,945,530 A * 7/1990 Sandell et al. .............. 369/291
4,991,048 A   2/1991 Ikebe et al. ................. 360/133
5,077,625 A * 12/1991 Shiba et al. ................. 360/133
5,121,277 A   6/1992 Ikebe et al. ................. 360/133
5,121,380 A * 6/1992 Fujita et al. ................. 360/133
5,166,922 A * 11/1992 Akiyama et al. ........... 360/133
5,325,257 A * 6/1994 Akiyama et al. ........... 360/133
5,444,691 A * 8/1995 Akiyama .................... 369/291
5,495,467 A * 2/1996 Tanaka et al. .............. 360/133

FOREIGN PATENT DOCUMENTS

| EP | 0336637 | | 3/1989 |
| JP | 63 96784 | * | 4/1988 |
| JP | 63 205872 | * | 8/1988 |

OTHER PUBLICATIONS

Patent Abstracts of Japan, vol. 12, No. 406, Jun. 14, 1988 (Seiichi et al.).

* cited by examiner

Primary Examiner—Brian E. Miller
(74) Attorney, Agent, or Firm—Jay H. Maioli

(57) ABSTRACT

A disc cassette comprises a case in which a recording disc is rotatably received. The case has an opening through which the disc is exposed. A bridge defined by the case extends across a mouth portion of the opening. A slide bar is arranged beside the bridge in a manner to move axially therealong. A shutter is connected to the slide bar to move therewith. The shutter selectively opens and closes the opening in accordance with axial movement of the slide bar. The slide bar has a base portion which comes beside the bridge when the shutter takes the open position, and the base portion is formed with a recess which faces in a direction away from the center of the disc recording medium.

7 Claims, 11 Drawing Sheets

DISC CASSETTE

This is a continuation of application Ser. No. 08/375,680 filed Jan. 20, 1995 now abandoned.

BACKGROUND OF THE INVENTION

1. Field of the Invention

The present invention relates in general to disc cassettes for use in a photo-electromagnetic disc player, and more particularly to the disc cassettes of a type having a shutter.

2. Description of the Related Art

In order to clarify the object of the present invention, one conventional disc cassette DC of the above-mentioned type will be described with reference to FIGS. 9A and 9B of the drawings which figures show front and back perspective views of the disc cassette DC, respectively.

The disc cassette DC shown in the drawings is of a type which writes and read information onto and from a photo-electromagnetic disc using so-called "magnetic modulation overwrite method". The disc cassette DC comprises a rectangular case 1 in which a photo-electromagnetic disc 2 is rotatably installed. To a center portion of the disc 2, there is fixed a hub 2a which, upon need of playing the disc 2, is held by a chucking member of a disc player (not shown). The case 1 comprises an upper half part 1a and a lower half part 1b which are coupled to have a thin space defined therebetween. As is seen from FIG. 9B which shows a back view of the disc cassette DC, the lower half part 1b is formed at its side rear portions with respective positioning openings 3. Upon insertion of the disc cassette DC into the disc player, positioning pins of the disc player are brought into engagement with the positioning openings 3, thereby to position the disc cassette DC relative to the disc player. The lower half part 1b of the case 1 has near one of the positioning openings 3 a slot in which a miss-write protection pawl 4 is slidably received. When the pawl 4 is moved to one given position, the disc 2 is prevented from recording or writing information thereon. The case 2 is formed at its side front portions with cassette pulling grooves 5. That is, when the disc cassette DC is inserted into a certain position of the disc player, cassette pulling pins of the player become engaged with the grooves 5 and pull the disc cassette DC to a certain bottom position of the disc player.

Figure 9A:
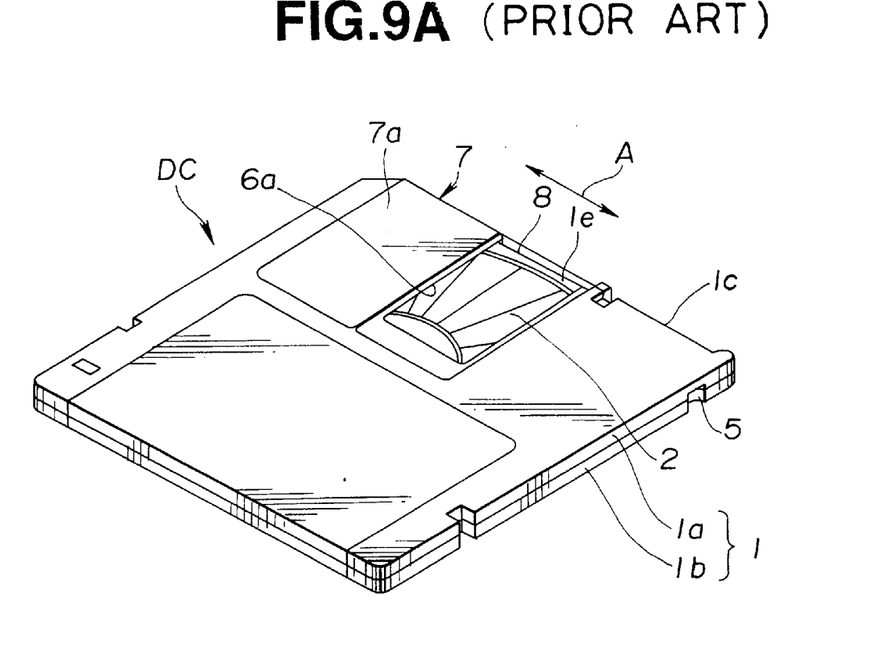
FIG. 9A is a view similar to FIG. 1A, but showing a conventional disc cassette.
Figure 9B:
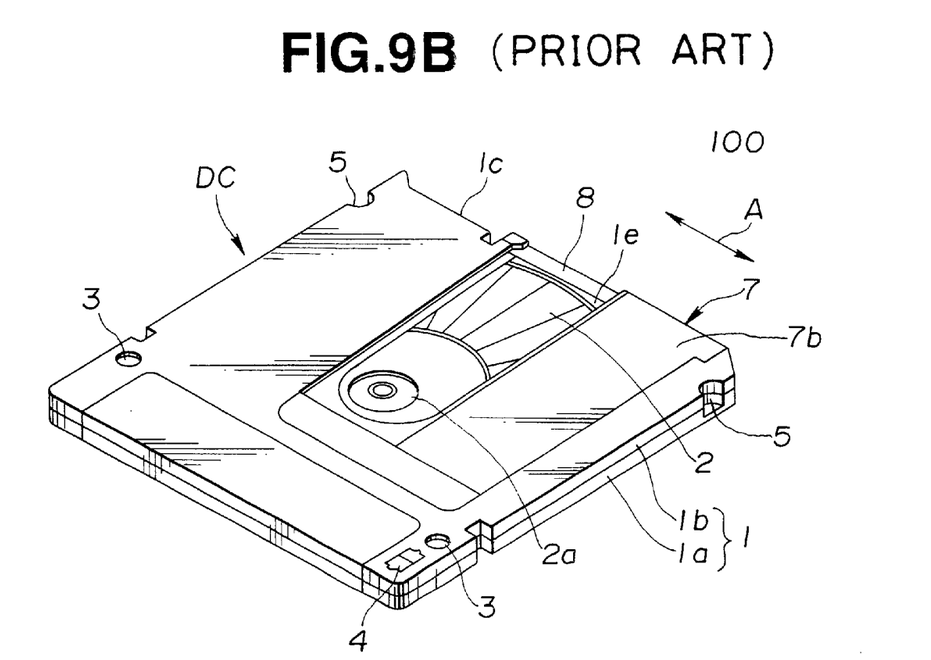
FIG. 9B is a view similar to FIG. 1B, but showing the conventional disc cassette.

As is seen from FIGS. 9A and 9B, the upper and lower half parts 1a and 1b of the case 1 are respectively formed with rectangular openings 6a and 6b through which upper and lower surfaces of the disc 2 are partially exposed. The lower opening 6b is larger than the upper opening 6a and is so sized as to expose the hub of the disc 2.

Each opening 6a or 6b has a bridge 1e defined by the case 1, which extends across a mouth portion of the opening, as shown.

A slide bar 8 is mounted on a front edge 1C of the case 1 in a manner to slide in the direction of the arrow "A". Connected to the slide bar 8 is a shutter 7 which comprises upper and lower shutter plates 7a and 7b. Thus, in response to the sliding movement of the slide bar 8, the upper and lower openings 6a and 6b are selectively closed and opened by the upper and lower shutter plates 7a and 7b. Although not shown in the drawings, a torsion spring is installed in the case 1 to bias the shutter 7 in the direction to close the openings 6a and 6b. FIGS. 9A and 9B show a condition wherein the shutter 7 assumes its full open position. The slide bar 8 has a thickness somewhat smaller than that of the disc 2 in the case 1.

Figure 10:
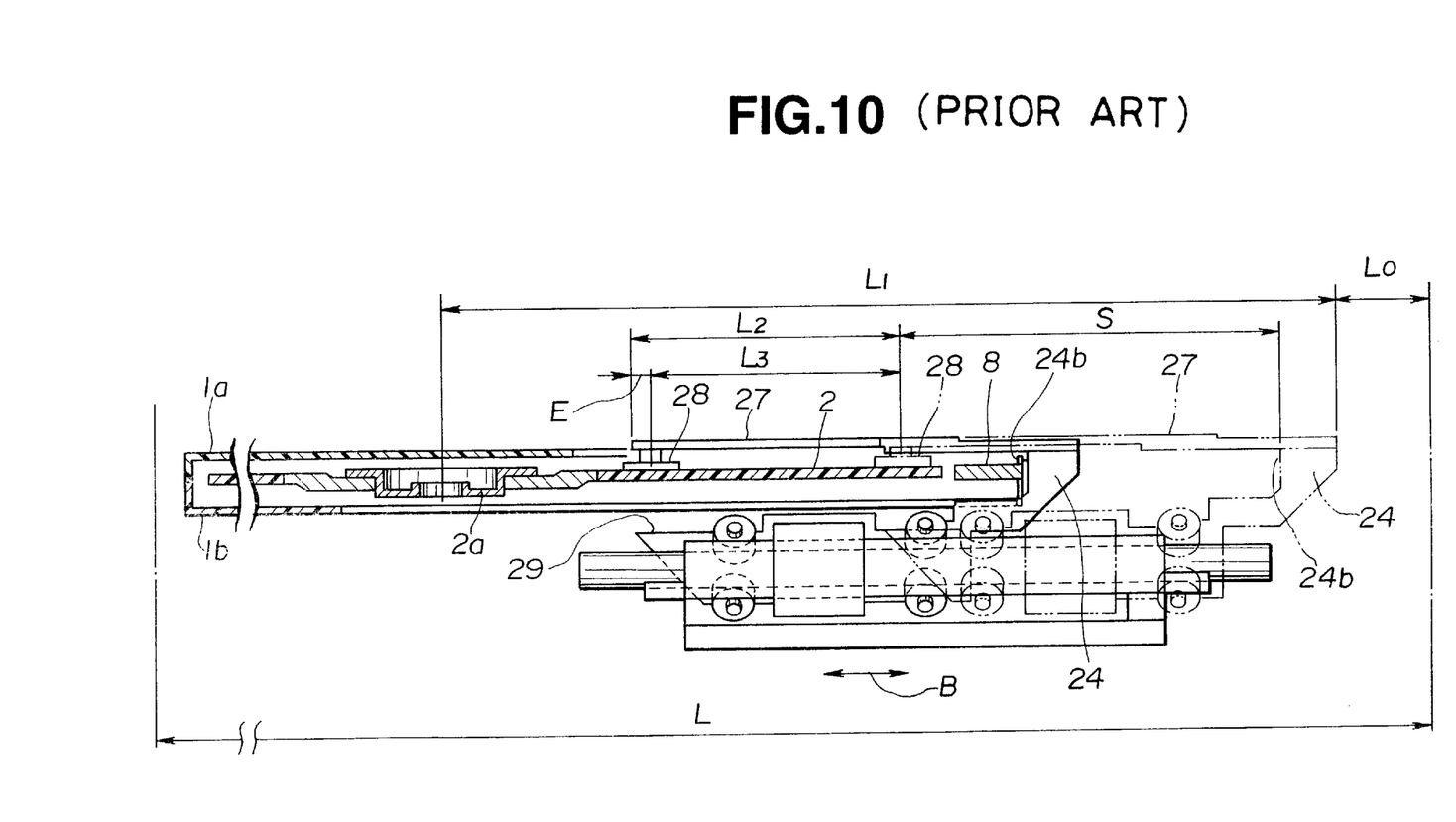
FIG. 10 is a view similar to FIG. 4, but showing a disadvantage obtained when using the conventional disc cassette.

FIG. 10 shows a condition wherein the disc cassette DC is properly set in the disc player. Under this condition, the shutter 7 of the disc cassette DC assumes its full open position and the hub 2a of the disc 2 is tightly held by the chucking member (not shown) of the disc player. Upon energization of a spindle motor (not shown) by which the chucking member is driven, the disc 2 is rotated about its axis. Within the disc player, there are installed a magnetic head 28 and an optical head 29 which are arranged to put therebetween the disc 2. These heads 28 and 29 face the upper and lower openings 6a and 6b of the case 1, respectively, and are mounted on a same head carriage 24 which is linearly movable in the direction of the arrow "B" in FIG. 10, that is, in the radial direction of the disc 2. The head carriage 24 moves between an outermost position as shown by a phantom line and an innermost position as shown by a solid line. Due to movement of the carriage 24, the two heads 28 and 29 are slid radially along the upper and lower openings 6a and 6b while making an interaction therebetween to write or read information on or from the disc 2.

Usually, the disc players used as a supplemental memory device of a computer are restricted by size. As is seen from FIG. 10, assuming that the length of the disc player is "L" and a part "L0" of the length "L" represents the length of a space for containing other mechanisms, the head carriage 24 has to be arranged within a limited zone having the length "L1". The length of an arm 27 through which the head 28 is connected to the head carriage 24 is so determined that when the head carriage 24 is located at the outermost position as shown by the phantom line, the head 28 is located at the outermost recording position of the disc 2. Thus, the innermost position of the head 28 is automatically determined when the head carriage 24 comes into abutment with the slide bar 8 of the disc cassette DC. However, in this case, it sometimes. occurs that the innermost recording area (i.e., the area having the width "E") of the disc 2 cannot be practically used, due to the limited movement of the heads 28 and 29 in the inward direction.

SUMMARY OF THE INVENTION

It is therefore an object of the present invention to provide a disc cassette which can provide the head carriage of the disc player with a more satisfactory moving area, thereby permitting effective usage of the recording area of the disc.

According to a first aspect of the present invention, there is provided a disc cassette which comprises a case in which a disc recording medium is rotatably received, the case having an opening through which at least an information recording area of the medium is exposed; a bridge defined by the case, the bridge extending across a mouth portion of the opening; a slide bar arranged beside the bridge in a manner to move axially therealong; and a shutter connected to the slide bar to move therewith, the shutter selectively opening and closing the opening in accordance with axial movement of the slide bar, wherein the slide bar has a base portion which comes beside the bridge when the shutter takes the open position, the base portion being formed with a recess which faces in a direction away from the center of the disc recording medium.

According to a second aspect of the present invention, there is provided a disc cassette which comprises a case in which a disc recording medium is rotatably received, the case having an opening through which at least an information recording area of the medium is exposed; a bridge defined by the case, the bridge extending across a mouth portion of the opening; a slide bar arranged beside the bridge in a manner to move axially therealong; and a shutter connected to the slide bar to move therewith, the shutter selectively opening and closing the opening in accordance with axial movement of the slide bar, wherein the slide bar comprises a base portion which comes beside the bridge when the shutter takes the open position and a projection which is to be pressed by a shutter opening pin of a disc player, the projection protruding outward from the base portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1A:
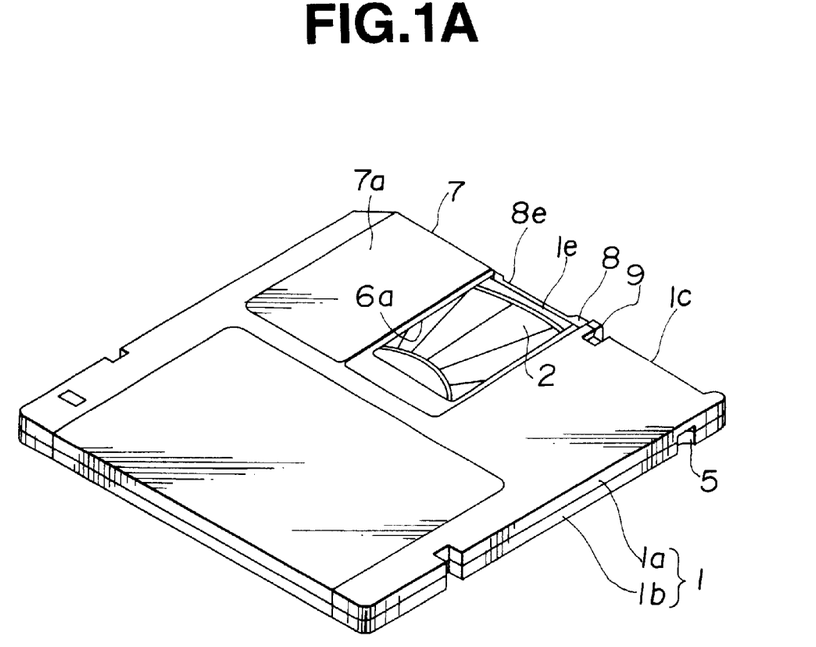
FIG. 1A is a front perspective view of a disc cassette of a first embodiment of the present invention.
Figure 1B:
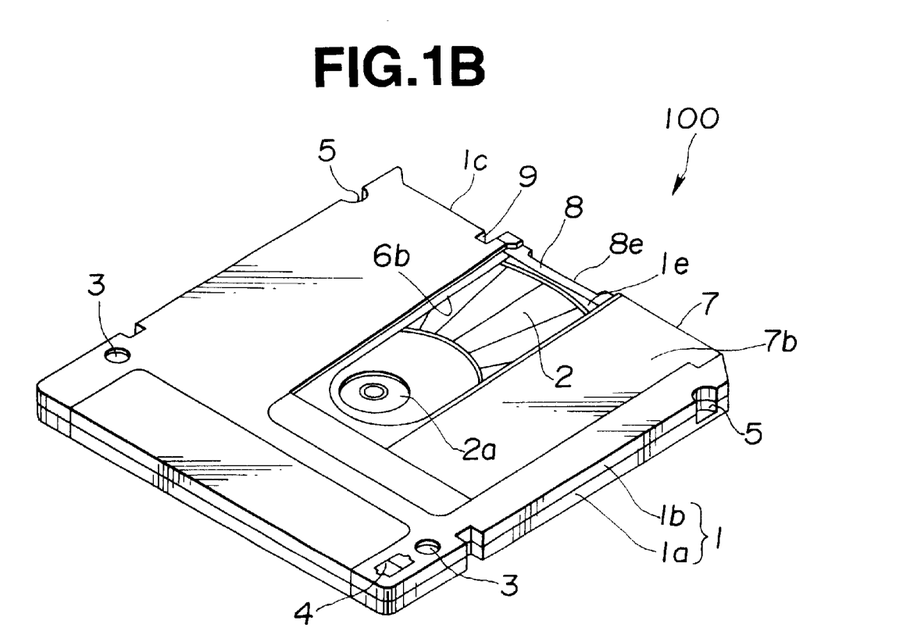
FIG. 1B is a back perspective view of the disc cassette of the first embodiment.

Referring to FIGS. 1A and 1B, there is shown a disc cassette of a first embodiment of the present invention, which is generally designated by numeral 100.

Since the disc cassette 100 of this first embodiment is similar in construction to that of the above-mentioned conventional disc cassette DC of FIGS. 9A and 9B, only parts and construction which are different from those of the conventional disc cassette DC will be described in detail in the following for facilitation of the description the same parts and construction are designated by the same numerals.

In this first embodiment 100, a recess 8e is formed at a front surface of the slide bar 8, which permits the head carriage of the disc player to have an increased inward moving zone. As will become apparent as the description proceeds, the recess 8e is so constructed as to receive a front face of the head carriage of the disc player when the head carriage comes to its innermost position.

Figure 2:
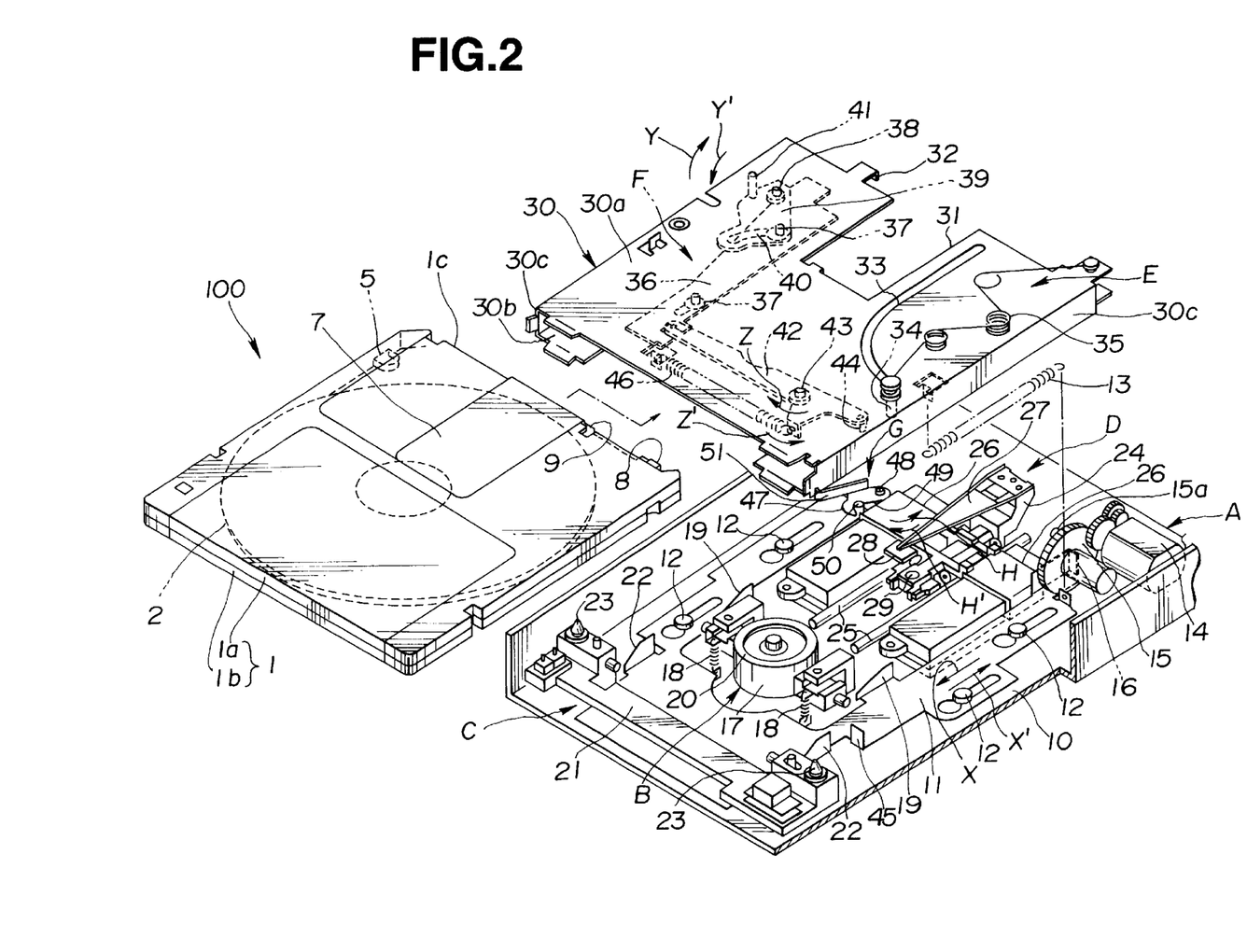
FIG. 2 is an exploded view of a disc player with which the disc cassette of the first embodiment is incorporated.
Figure 3:
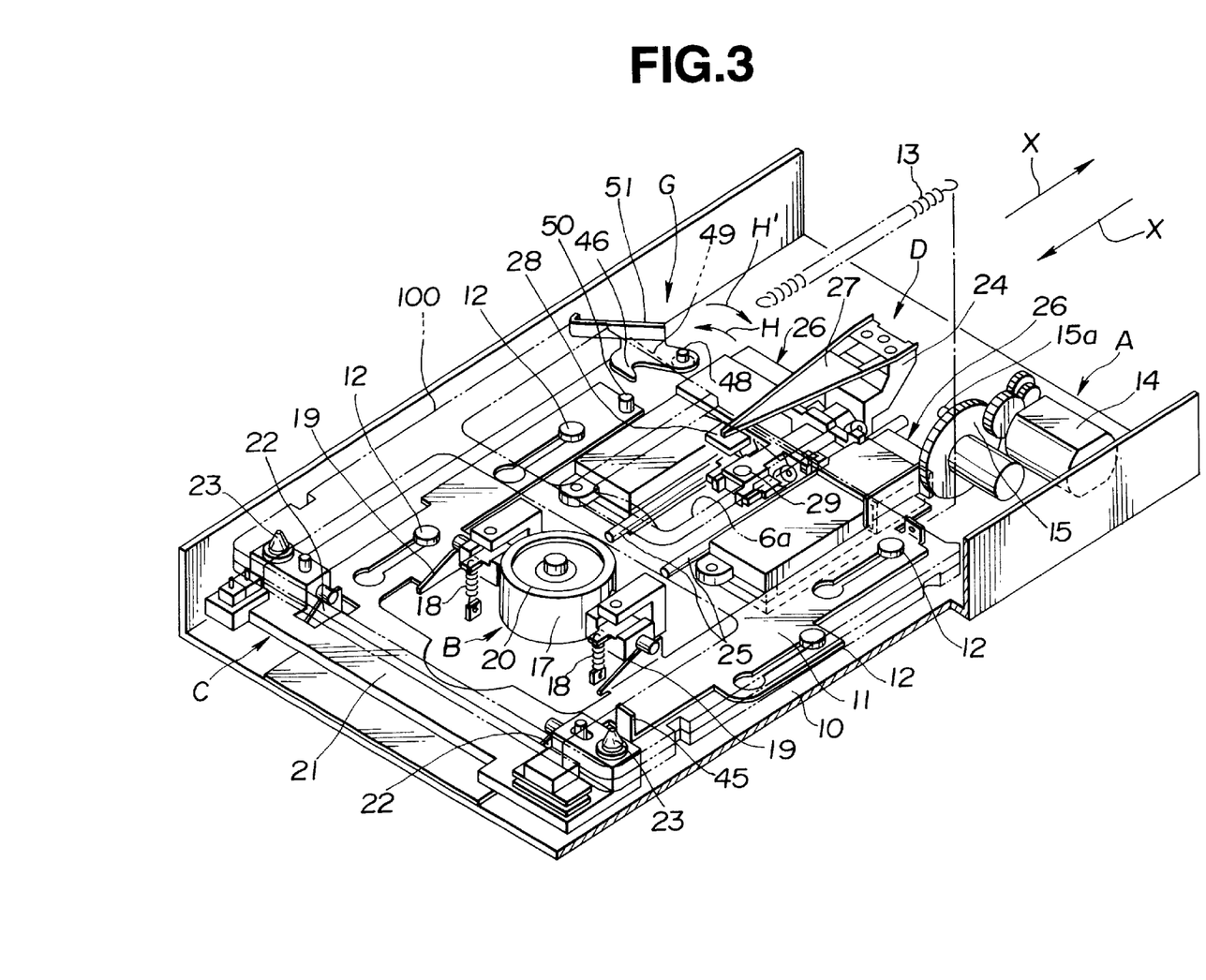
FIG. 3 is a partially cut perspective view of the disc player, showing a condition wherein the disc cassette of the first embodiment is properly set therein.

In FIGS. 2 and 3, there is shown a disc player by which the disc cassette 100 is operatively played. In these figures, particularly apparent in FIG. 2 there is denoted by numeral 10 a chassis on which a slide plate 11 is mounted to slide in the directions of the arrows X and X'. For this slide movement, the slide plate 11 is formed with two pairs of slots (no numerals) with which respective guide pins 12 fixed to the chassis 10 are slidably engaged. To the slide plate 11, there is connected one end of a coil spring 13, so that the slide plate 11 is biased toward a loading position, that is, in the direction of the arrow X'. It is to be noted that in FIG. 2, the slide plate 11 assumes the loading position, while, in FIG. 3, the slide plate 11 assumes an unloading position.

Designated by reference A is an auto-eject mechanism A which comprises an electric motor 14 mounted on the chassis 10. The motor 14 drives an output gear 15 which is provided with an engaging pin 15a. When, upon energization of the motor 14, the engaging pin 15a abuts against a lug 16 raised from the slide plate 11 and presses the same, the slide plate 11 is shifted from the loading position to the unloading position against the force of the coil spring 13.

Designated by reference B is a disc rotating mechanism which comprises a motor carrying unit 17 which is vertically movably mounted on the chassis 10. The motor carry unit 17 takes its lower position due to the force of coil springs 18 when the slide plate 11 is in the unloading position. In contrast, when the slide plate 11 is brought to the loading position, the motor carrying unit 17 is raised by sloped lugs 19 of the slide plate 11 thereby to take its upper position. The motor carrying unit 17 carries a spindle motor whose output shaft is provided with a chucking member 20. When the motor carrying unit 17 is lifted to the upper position, the chucking member 20 holds the hub 2a of the disc cassette 100 which has been kept in the disc player. Thus, when, under this condition, the spindle motor is energized, the disc 2 is turned.

Designated by reference C is a cassette positioning mechanism which comprises a pin holding block 21 which is vertically movably mounted on the chassis 10. The pin holding block 21 takes its lower position when the slide plate 11 is in the unloading position. In contrast, when the slide plate 11 is brought to the loading position, the pin holding block 21 is raised by sloped lugs 22 of the slide plate 11 to thereby take its upper position. The pin holding block 21 is provided at both ends with respective positioning pins 23. When the pin holding block 21 is lifted to the upper position, the positioning pins 23 become engaged with the positioning openings 3 of the disc cassette 100 which has been kept in the disc player. With this, the positioning of the disc cassette 100 in the player is accomplished.

Designated by reference D is a head mechanism which comprises a head carriage 24 which is arranged on the chassis 10 to move in the directions of the arrows X and X'. For the movement of the head carriage 24, a pair of guide rails 25 are mounted on the chassis 10, along and on which the head carriage 24 slides. A pair of linear motors 26 are arranged beside the guide rails 25. That is, when the linear motors 26 are energized, the head carriage 24 is moved in the direction of the arrow X or X' along the guide rails 25. The head carriage 24 carries an arm 27 of which leading end is equipped with a magnetic head 28. At a lower position of the magnetic head 28, there is arranged an optical head 29 which is also carried by the head carriage 24. In practice, the optical head 29 is an objective lens, and a laser beam source (not shown) is mounted on a position of the chassis 10. When the disc cassette 100 is properly set in the disc player, the disc 2 is placed between the magnetic and optical heads 28 and 29. As is known in the art, due to the interaction between the two heads 28 and 29, writing or reading of information onto or from the photo-electromagnetic disc 2 is achieved.

Designated by numeral 30 is a cassette holder which is arranged above the chassis 10. The cassette holder 30 is in the form of a rectangular frame and comprises an upper wall 30a, a lower wall 30b and two narrow side walls 30c, which are united to have the holder sized to receive therein the disc cassette 100. The lower wall 30b is formed with a large cut (not shown) into which the motor carrying unit 17 and the optical head 29 are to be received when the disc cassette 100 is properly set in the disc player. The upper wall 30a is formed with a cassette stopper 32 against which a leading edge of the disc cassette 100 abuts when the cassette 100 is properly set in the cassette holder 30.

As will be described in detail in the following, the cassette holder 30 is equipped with a shutter opening/closing mechanism E, an auto-eject mechanism F and a slide plate locking mechanism G.

As is seen from FIG. 2, the shutter opening/closing mechanism E comprises a curved cam slot 33 formed in the upper wall 30a of the cassette holder 30, a shutter opening pin 34 slidably engaged with the cam slot 33, and a torsion coil spring 35 having one end fixed to the pin 34 and the other end fixed to the upper wall 30a. Due to the force of the torsion coil spring 35, the shutter opening pin 34 is biased to take one end position of the slot 33, that is, the position as shown in FIG. 2.

The auto-eject mechanism F comprises a first eject plate 36 which is arranged beneath a lower surface of the lower wall 30b of the cassette holder 30. The first eject plate 36 is movable in the directions of the arrows X and X' of FIG. 2 while being guided by guide pins 37 fixed to the lower wall 30b. That is, the guide pins 37 are slidably engaged with respective slots (no numerals) formed in the first eject plate 36. A pivot shaft 38 is fixed to one end of the first eject plate 36 for rotatably holding a second eject plate 39. The second eject plate 39 is formed with a curved cam slot 40 which is slidably engaged with one of the above-mentioned guide pins 37. The second eject plate 39 is provided with a cassette drawing pin 41, so that when the second eject plate 39 turns about the pivot shaft 38, the pin 41 moves in the directions of the arrows Y and Y'.

Designated by numeral 42 is a third eject plate which is rotatable in the directions of the arrows Z and Z' about a pivot shaft 43 fixed to the lower wall 30b of the cassette holder 30. One end of the third eject plate 42 is engaged with an end of the first eject plate 36. The third eject plate 42 is provided at the other end thereof with a hold pin 44 which is detachably engageable with a raised lug 45 of the slide plate 11. Due to the force of a coil spring 46 arranged between the third eject plate 42 and a part of the lower wall 30b, the third eject plate 42 is biased to pivot about the pivot shaft 43 in the direction of the arrow Z.

The slide plate locking mechanism G comprises a latch plate 47 which is rotatably connected through a pivot shaft 48 to the chassis 10. Thus, the latch plate 47 is rotatable about the pivot shaft 48 in the directions of the arrows H and H'. Due to the force of a torsion coil spring 49, the latch plate 47 is biased to pivot in the direction of the arrow H and detachably engageable with a latch pin 50 fixed to the slide plate 11. The latch plate 47 is formed with a release lever 51.

In the following, operation of the disc player having the above-mentioned construction will be described with reference to FIG. 2.

For ease of understanding, the description will be commenced with respect to a rest condition of the disc player. Under this rest condition, the slide plate 11 is latched relative to the chassis 10. That is, the slide plate 11 assumes the unloading position having the latch pin 50 latched by the latch plate 47 and having the raised lug 45 pressed against the hold pin 44 of the third eject plate 42 in the direction of the arrow X, causing the cassette drawing pin 41 to assume a stand-by position, as shown in FIG. 2. Furthermore, under this rest condition, the motor carrying unit 17 and the pin holding block 21 assume their lower positions.

When the disc cassette 100 is inserted into the cassette holder 30, the disc cassette 100 pushes at its front end the shutter opening pin 34. Thus, with insertion of the disc cassette 100 into the cassette holder 30, the pin 34 is slid in and along the cam slot 33 toward a rear end thereof against the force the torsion coil spring 35. During this movement of the shutter opening pin 34, the pin 34 is slid on and along the front edge of the disc cassette 100 while pushing the slide bar 8 of the shutter 7, thus opening shutter 7.

When the disc cassette 100 is further inserted into the cassette holder 30, the disc cassette 100 pushes the release lever 51. Following this, the latch plate 47 is turned in the direction of the arrow H', releasing the latch pin 50, thereby cancelling the latched condition of the slide plate 11 to the chassis 10. Thus, due to the force of the coil spring 13, the slide plate 11 is moved in the direction of the arrow X to the loading position. During this movement of the slide plate 11, the raised lug 45 is moved away from the hold pin 44, and thus the third eject plate 42 is turned in the direction of the arrow Z due to the force of the coil spring 46. With this, the first eject plate 36 is slid in the direction of the arrow X' and at the same time the second eject plate 39 is turned in the direction of the arrow Y. With this turning of the second eject plate 39, the cassette drawing pin 41 is put into the cassette pulling groove 5. Thus, thereafter, the disc cassette 100 is automatically drawn into a deeper position in the cassette holder 30 with the movement of the first eject plate 36 in the direction of the arrow X'. The inward movement of the disc cassette 100 continues until the disc cassette 100 abuts the cassette stopper 32 of the cassette holder 30. Under this condition, the disc cassette 100 is fully received in the cassette holder 30 and the shutter 7 of the disc cassette 100 is fully opened.

When the slide plate 11 is shifted from the unloading position to the loading position in the above-mentioned manner, the motor carrying unit 17 and the pin holding block 21 are lifted from the lower positions to the upper positions by the sloped lugs 19 and 22. Thus, the chucking member 20 of the motor carrying unit 17 holds the hub 2a of the disc 2 in the disc cassette 100, permitting the disc 2 to rotate upon energization of the spindle motor. Furthermore, the positioning pins 23 of the pin holding block 21 are put into the positioning openings 3 (see FIG. 1B) of the disc cassette 100, so that the disc cassette 100 is positioned relative to the disc player. When, under rotation of the disc 2, the linear motors 26 are energized, the head carriage 24 is moved in the directions of the arrows X and X', thereby moving the magnetic and optical heads 28 and 29 in the radial direction of the disc 2. During the movement of the two heads 28 and 29, writing or reading of information onto or from the disc 2 is carried out.

As has been described hereinabove, under rotation of the photo-electromagnetic disc 2, the head carriage 24 moves on and along the paired guide rails 25 in the directions of the arrows X and X' of FIG. 2 and thus the two heads 28 and 29 move in the radial direction over the photo-electromagnetic disc 2. Writing or reading of information onto or from the disc 2 is carried out by the heads 28 and 29 in a so-called "Magnetic Field Modulation Overwrite Process".

Figure 4:
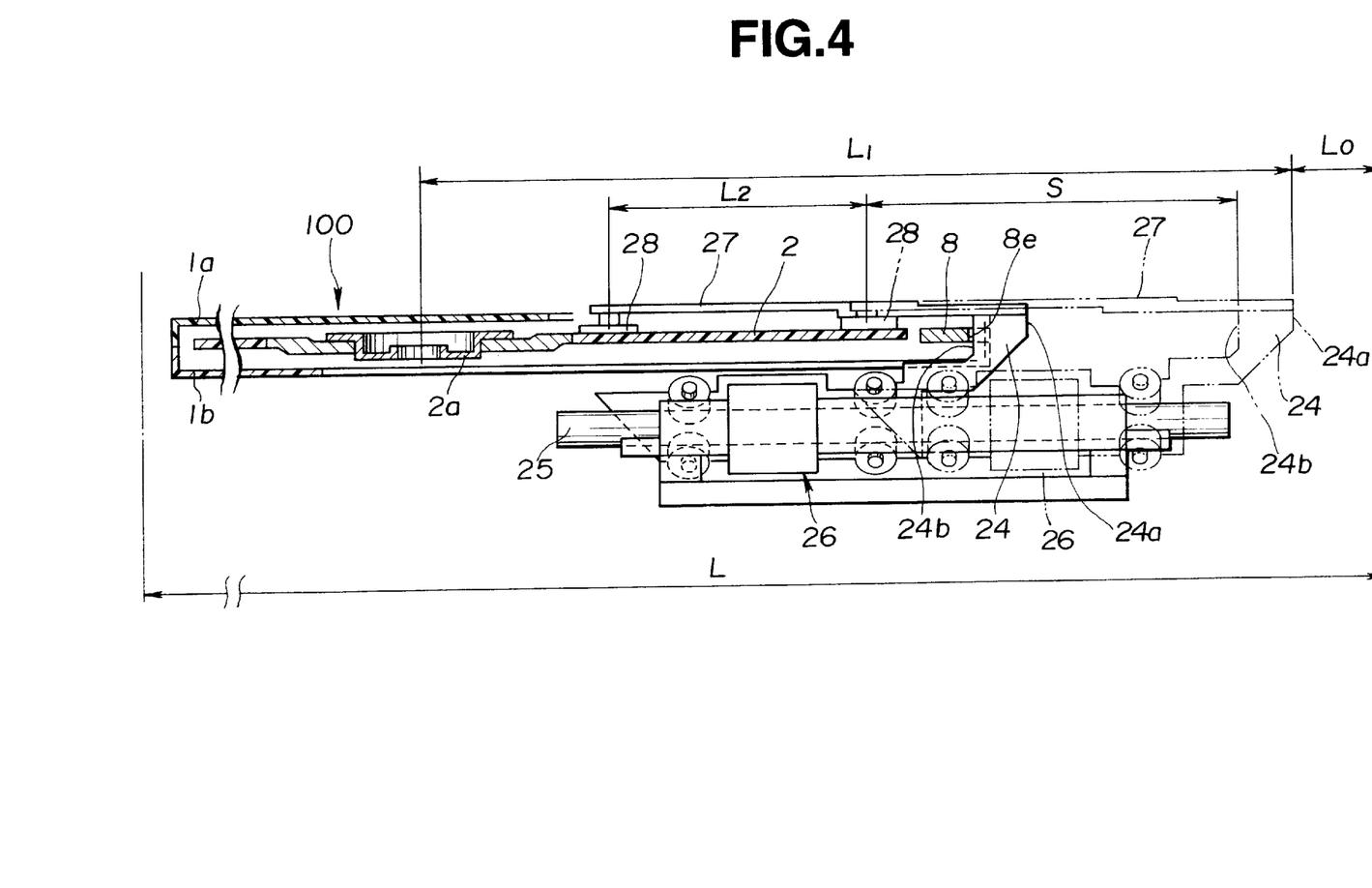
FIG. 4 is a sectional view of the disc player, depicting an advantage obtained when using the disc cassette of the first embodiment.

As is seen from FIG. 4, the head carriage 24 defines, at a portion from which the arm 27 extends toward the head 28, a front face 24b which faces a front end of the disc cassette 100 which is properly set in the disc player. That is, the radially moved distance of the two heads 28 and 29 relative to the disc 2 depends on the distance defined between the front face 24b of the head carriage 24 and the front end of the disc cassette 100. If, for increasing the distance, the length of the arm 27 is increased, the head carriage 24 and the arm 27 are projected significantly rearward when the head carriage 24 comes to its outermost position. This creates a need of providing the disc player with a space for containing such projected members, and thus the disc player becomes bulky in construction.

In the following, an advantage obtained by the first embodiment 100 will be described with reference to the drawings, particularly FIGS. 2 and 4.

That is, in accordance with the present invention, such a disadvantage is solved by the recess 8e of the slide bar 8 of the disc cassette 100. The reason will become apparent from the following.

As is seen from FIG. 4, assuming that the length of the disc player is "L" and a part "L0" of the length "L" represents the length of a space (or dead space) for containing the other mechanisms, the head carriage 24 has to be arranged within a limited zone having the length "L1". The length "S" of the arm 27 is so determined that when the head carriage 24 is located at the outermost position as shown by the phantom line, the head 28 is located at the outermost recording position of the disc 2 in the disc cassette 100.

At the outermost position of the head carriage 24, a rear face 24a of the head carriage 24 is located at the front end of the dead space having the length "L0"; at the innermost position of the head carriage 24, the front face 24b is in contact with the slide bar 8 of the disc cassette 100. However, in the present invention, the recess 8e formed in the slide bar 8 can receive the front face 24b of the head carriage 24, thereby increasing the stroke "L2" of the head 28 in the inward direction. That is, when the disc cassette 100 of the invention is used, the magnetic head 28 and the optical head 29 can be moved to a more inward position of the disc 2 than that of the above-mentioned conventional disc cassette DC. Thus, in the invention, the recording area of the disc 2 can be fully used.

Referring to FIGS. 5, 6A, 6B, 7A, 7B, 8A and 8B, there is shown a disc cassette of a second embodiment of the present invention, which is generally designated by numeral 200.

In the following description, parts and construction substantially the same as those of the first embodiment 100 are designated by the same numerals and detailed explanation of such will be omitted.

Figure 5:
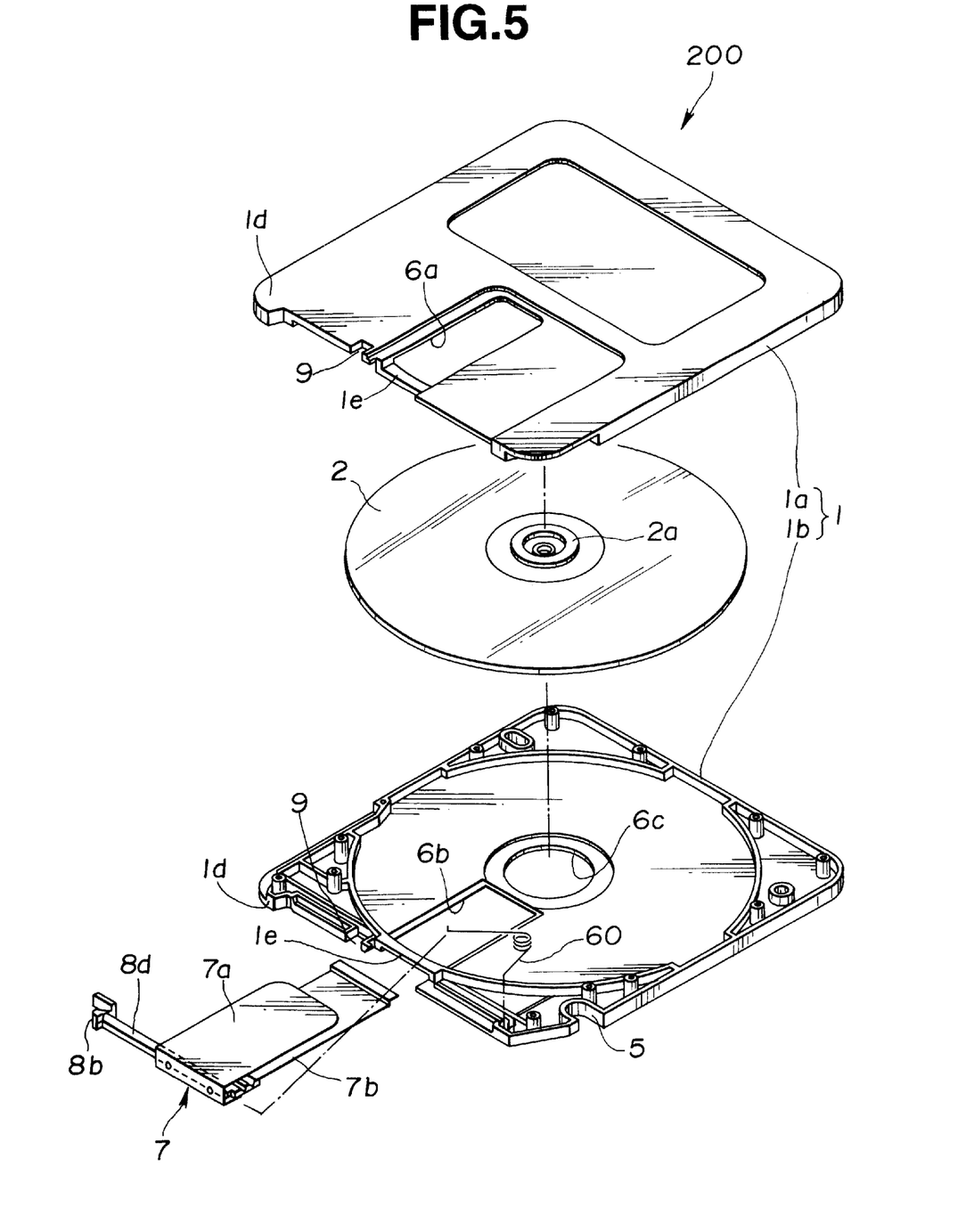
FIG. 5 is an exploded view of a disc cassette of a second embodiment of the present invention.

In the second embodiment of the invention, as is seen from FIG. 5, the slide bar 8 of the disc cassette 200 comprises a bar proper 8d and an enlarged head portion 8b.

The head portion 8b has a projection which is projected in the direction away from the case 1. That is, as is seen from FIGS. 7A and 7B, the projection of the head portion 8b protrudes from the bar proper 8d in the direction of the arrow X of the drawings.

That is, in this second embodiment 200, the gap located on the front surface of the bar proper 8d and between the projected head portion 8b and where the shutter 7 is connected to the side bar 8 corresponds to the recess 8e of the first embodiment 100, which functions to receive the front face 24b (see FIG. 4) of the head carriage 24 when the head carriage 24 is moved to the innermost position.

Referring back to FIG. 5, to the bar proper 8d, there is fixed the shutter 7 which comprises the upper and lower shutter plates 7a and 7b. The slide bar 8 is slidably put in a grooved construction of the front edge of the case 1, so that in response to the sliding movement of the slide bar 8, the upper and lower shutter plates 7a and 7b selectively close and open their corresponding upper and lower openings 6a and 6b. Between the slide bar 8 and the lower half part 1b of the case 1, there is disposed a torsion coil spring 60 by which the shutter 7 is biased in the direction to close the openings 6a and 6b. In the illustrated embodiment 200, the lower opening 6b for receiving the optical head 29 and a circular opening 6c for receiving the chucking member 20 are independently formed in the lower half part 1b of the case 1.

Figure 6A:
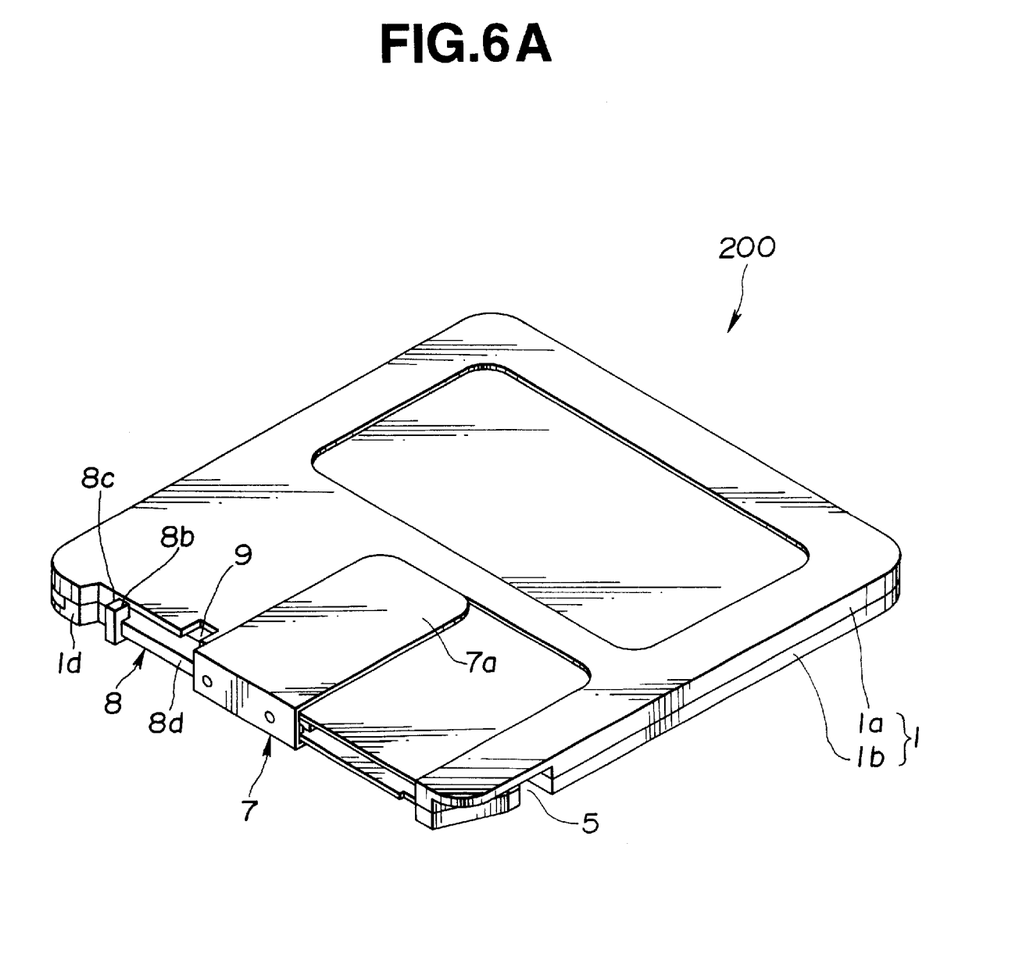
FIG. 6A is a front perspective view of the disc cassette of the second embodiment.
Figure 6B:
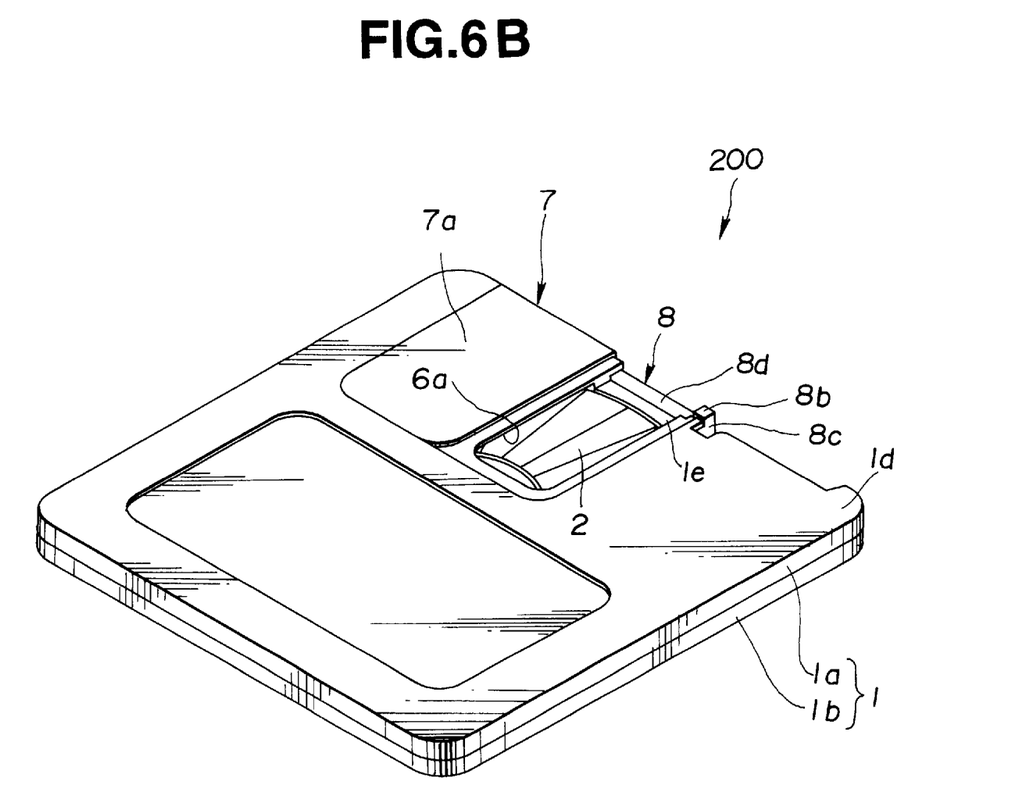
FIG. 6B is a view similar to FIG. 6A, but showing a condition wherein the disc cassette is reoriented and a shutter of the disc cassette is opened.
Figure 7A:
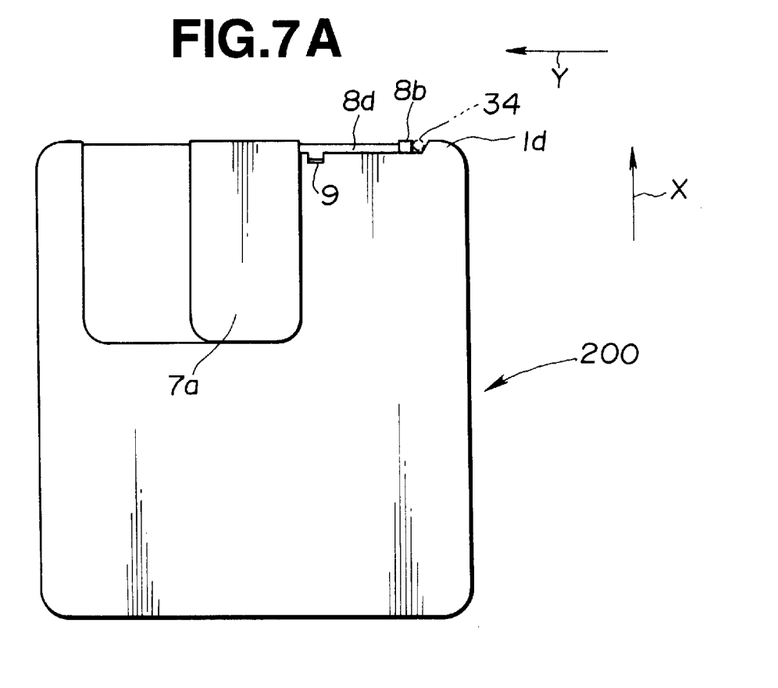
FIG. 7A is a plan view of a disc cassette of the second embodiment of the present invention.
Figure 7B:
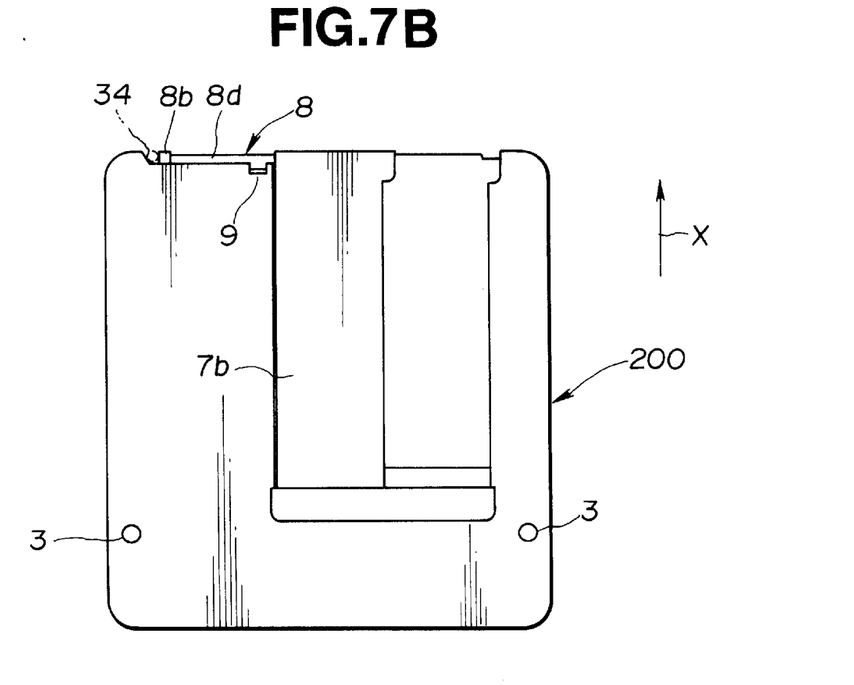
FIG. 7B is a bottom view of the disc cassette of the second embodiment.
Figure 8A:
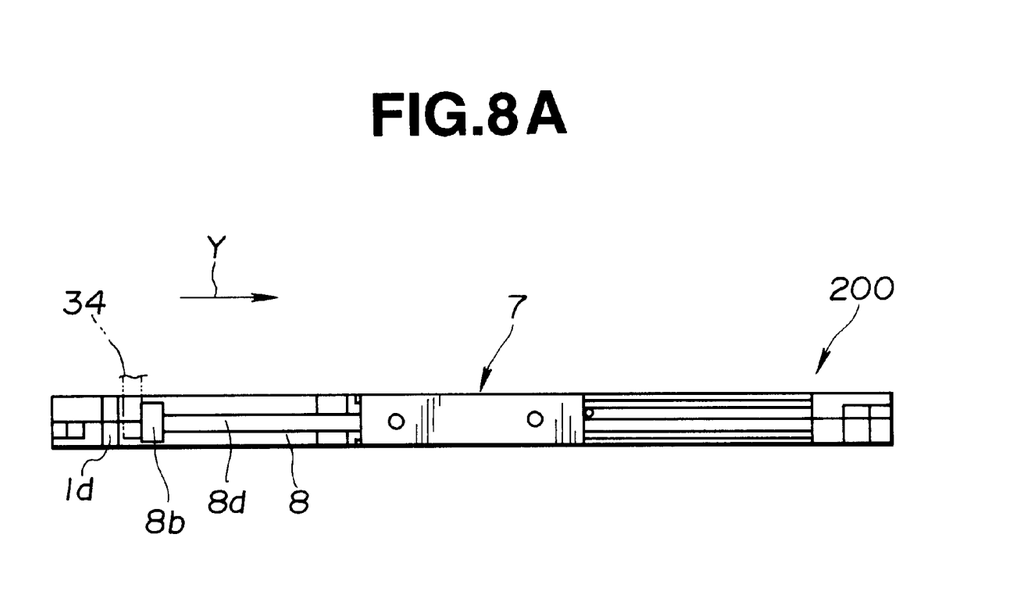
FIG. 8A is a side view of the disc cassette of the second embodiment.
Figure 8B:
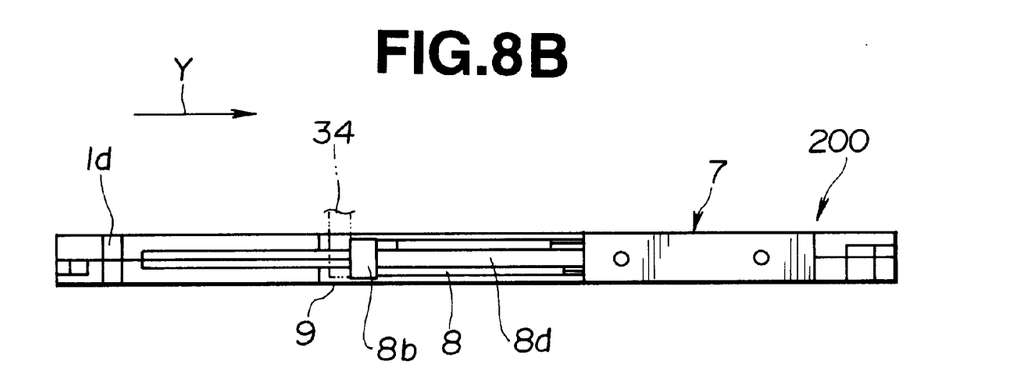
FIG. 8B is a view similar to FIG. 8A, but showing a different condition of the disc cassette.

As is seen from FIGS. 6A and 6B, the case 1 is formed at its front side portion with a projection 1d of which inside wall faces an opposed face 8c of the head portion 8b of the slide bar 8. Designated by numeral 9 is a pin holding recess into which the shutter opening pin 34 of the disc player drops when the disc cassette 200 is fully received in the cassette holder 30.

When, as will be understood from FIG. 6A, the disc cassette 200 is inserted into the cassette holder 30 of the disc player, the shutter opening pin 34 of the player is led into a space defined between the projection 1d of the disc cassette 200 and the head portion 8b of the same. With insertion of the disc cassette 200 into the cassette holder 30, the pin 34 is slid on and along the front edge of the disc cassette 200 while pushing the head portion 8b of the slide bar 8. Thus, against the force of the torsion coil spring 60, the slide bar 8 is moved in the direction of the arrow Y in FIGS. 7A, 8A and 8B. When the disc cassette 200 is fully inserted into the cassette holder 30, the shutter 7 fixed to the slide bar 8 fully opens the upper and lower openings 6a and 6b of the disc cassette 200.

Because the head portion 8b and the bar proper 8d constitute a gap which corresponds to the recess 8e of the first embodiment 100, the recording area of the disc 2 can be fully utilized similar to of the first embodiment 100. When the size of the head portion 8b is increased, the sliding engagement between the head portion 8b and the shutter opening pin 34 during the shutter opening process is much improved.

Although the above description is directed to a disc cassette which contains a photo-electromagnetic disc, the prevent invention is not limited to such disc cassette. That is, the present invention is applicable to various types of disc cassettes.

Although in the above-mentioned embodiments 100 and 200, the slide bar 8 and the shutter 7 are depicted separate members, they may be constructed as an integrated member.

What is claimed is:

1. A disc cassette for use in a disc player having a head carriage, the cassette comprising:

a case receiving a rotatable disc recording medium and having an opening through which an information recording area of said medium is exposed;

a bridge defined by said case and formed in a front surface thereof extending across a mouth portion of said opening parallel to said front surface of said case and being offset therefrom in a direction toward a center of said disc recording medium;

a slide bar having a width in a direction perpendicular to a top surface of said disc smaller than a width of said case in said direction perpendicular to the top surface of said disc and slidably mounted beside said bridge for moving axially therealong; and a shutter connected to said slide bar for moving therewith to selectively open and close said opening in accordance with axial movement of said slide bar, wherein a front surface of said shutter is flush with said front surface of said case, and wherein when said shutter is moved to open said opening, said front surface of said shutter forms a continuous line along said front surface of said case with an edge of said case, and wherein said slide bar has a base portion which overlaps an entire length of said bridge when said shutter is in an open position, said base portion being formed with a recess which faces in a direction away from the center of said disc recording medium and adapted to mate with a front face of said head carriage of said disc player when said head carriage comes to its innermost position, and wherein said recess is defined between a front surface of said base portion of said slide bar and said front surface of said shutter, thereby increasing a stroke of the head carriage in an inward radial direction of said disc recording medium when said shutter is in said open position.

2. The disc cassette as claimed in claim 1, wherein said slide bar and said shutter are integrally and unitarily formed to constitute a single part.

3. The disc cassette as claimed in claim 1, wherein said disc recording medium is a photo-electromagnetic disc.

4. A disc cassette for use in a disc player having a head carriage, the cassette comprising:

a case receiving a rotatable disc recording medium and having an opening through which an information recording area of said medium is exposed;

a bridge defined by said case and formed in a front surface thereof extending across a mouth portion of said opening parallel to said front surface of said case and being offset therefrom in a direction closer to a center of said disc recording medium;

a slide bar having a width in a direction perpendicular to a top surface of said disc smaller than a width of said case in said direction perpendicular to the top surface of said disc and slidably mounted beside said bridge for moving axially therealong; and a shutter connected to said slide bar for moving therewith to selectively open and close said opening in accordance with axial movement of said slide bar, wherein a front surface of said shutter is flush with said front surface of said case, and wherein when said shutter is moved to open said opening, said front surface of said shutter forms a continuous line along said front surface of said case with an edge of said case, and wherein said slide bar comprises a base portion which overlaps an entire length of said bridge when said shutter is in an open position and a projection protruding outward from an end of said base portion and beyond a front surface thereof for being pressed by a shutter opening pin of said disc player, said projection forming a gap between a front surface of said base portion of said slide bar adjacent said projection and said front surface of said shutter, said gap is adapted to mate with a front face of said head carriage of said disc player when said head carriage comes to its innermost radial position relative to said disc recording medium when said shutter is in said open position.

5. The disc cassette as claimed in claim 4, wherein said slide bar and said shutter are integrally and unitarily formed to constitute a single part.

6. The disc cassette as claimed in claim 4, wherein said disc recording medium is a photo-electromagnetic disc.

7. A disc cassette for use in a disc player having a head carriage, the cassette comprising:

a case receiving a rotatable disc recording medium and having an opening through which part of said medium is exposed;

a bridge defined by said case and formed in a front surface thereof extending across a mouth portion of said opening parallel to said front surface of said case and being offset therefrom in a direction closer to a center of said disc recording medium;

a slide bar having a width in a direction perpendicular to a top surface of said disc smaller than a width of said case in said direction perpendicular to the top surface of said disc and slidably mounted beside said bridge for moving axially therealong; and a shutter connected to said slide bar for moving therewith to selectively open and close said opening in accordance with axial movement of said slide bar, wherein a front surface of said shutter is flush with said front surface of said case, and wherein when said shutter is moved to open said opening, said front surface of said shutter forms a continuous line along said front surface of said case with an edge of said case, and wherein said slide bar has a base portion which overlaps an entire length of said bridge when said shutter is an open position, said base portion being formed with a recess defined between a front surface of said base portion of said slide bar and said front surface of said shutter and facing in a direction away from the center of said disc recording medium and adapted to mate with a front face of said head carriage of said disc player when said head carriage comes to its innermost radial position relative to said disc recording medium when said shutter is in said open position.

* * * * *